US012175910B2

(12) United States Patent
Zhang et al.

(10) Patent No.: US 12,175,910 B2
(45) Date of Patent: Dec. 24, 2024

(54) METHOD FOR GRAY SCALE MEASUREMENT, NON-TRANSITORY STORAGE MEDIUM, AND PROCESSOR

(71) Applicant: XI'AN NOVASTAR TECH CO., LTD., Shaanxi (CN)

(72) Inventors: Yue Zhang, Shaanxi (CN); Hongchun Cong, Shaanxi (CN); Cheng Yang, Shaanxi (CN)

(73) Assignee: XI'AN NOVASTAR TECH CO., LTD., Shaanxi (CN)

( * ) Notice: Subject to any disclaimer, the term of this patent is extended or adjusted under 35 U.S.C. 154(b) by 0 days.

(21) Appl. No.: 18/022,176

(22) PCT Filed: Oct. 19, 2020

(86) PCT No.: PCT/CN2020/121950
§ 371 (c)(1),
(2) Date: Feb. 20, 2023

(87) PCT Pub. No.: WO2022/082370
PCT Pub. Date: Apr. 28, 2022

(65) Prior Publication Data

US 2023/0298503 A1 Sep. 21, 2023

(51) Int. Cl.
*G09G 3/20* (2006.01)
*G09G 3/32* (2016.01)

(52) U.S. Cl.
CPC ............ *G09G 3/2007* (2013.01); *G09G 3/32* (2013.01); *G09G 2360/16* (2013.01)

(58) Field of Classification Search
CPC ........ G09G 3/006; G09G 3/2007; G09G 3/32; G09G 2320/029; G09G 2320/0693; G09G 2360/16; G09G 5/10
See application file for complete search history.

(56) References Cited

U.S. PATENT DOCUMENTS

| | | | | |
|---|---|---|---|---|
| 9,691,324 | B2 | 6/2017 | Choe | |
| 2020/0193904 | A1 | 6/2020 | Kho | |
| 2021/0407367 | A1* | 12/2021 | Zhang | G09G 3/32 |

FOREIGN PATENT DOCUMENTS

| | | | |
|---|---|---|---|
| CN | 1658679 | A | 8/2005 |
| CN | 1838223 | A | 9/2006 |
| CN | 103700353 | A | 4/2014 |
| CN | 104299565 | A | 1/2015 |
| CN | 104318893 | A | 1/2015 |
| CN | 104992683 | A | 10/2015 |
| CN | 106910471 | A | 6/2017 |
| CN | 109559701 | A | 4/2019 |

(Continued)

OTHER PUBLICATIONS

English Translation of CN111354299A (Year: 2020).*
The search report of family CN application No. 202080104120X issue on Mar. 29, 2024.

*Primary Examiner* — Nelson M Rosario
(74) *Attorney, Agent, or Firm* — Samson G. Yu

(57) ABSTRACT

Provided are a method and an apparatus for gray scale measurement. The method may include: a first part of gray scale data of an LED screen is collected when the LED screen is displaying an image; a type of a chip used for driving the LED screen is determined; and a second part of gray scale data of the LED screen is predicted based on the type of the chip and the first part of gray scale data.

19 Claims, 3 Drawing Sheets

(56) References Cited

FOREIGN PATENT DOCUMENTS

| | | | | | |
|---|---|---|---|---|---|
| CN | 111354299 | A | * | 6/2020 | ............... G09G 3/32 |
| JP | 2008058959 | A | | 3/2008 | |
| JP | 2009192647 | A | | 8/2009 | |
| JP | 2017041740 | A | | 2/2017 | |
| KR | 20070021060 | A | | 2/2007 | |

* cited by examiner

METHOD FOR GRAY SCALE MEASUREMENT, NON-TRANSITORY STORAGE MEDIUM, AND PROCESSOR

TECHNICAL FIELD

The present application relates to a technical field of image processing, in particular to a method and for gray scale measurement, a non-transitory storage medium, and a processor.

BACKGROUND

With a development of a Light-Emitting Diode (LED) display technology, LED screens have been applied to various fields due to advantages of low cost, low power consumption, high visibility and free assembly. At the same time, with a popularization of the LED screens, markets and users have higher and higher requirements for display quality of the LED screens. Therefore, how to improve the display quality of the LED screens has become a research hotspot in this field.

Due to a Pulse Width Modulation (PWM) driving mechanism and a manufacturing process of the LED, the LED screen has a problem of poor linearity, which is a fundamental factor that affects a picture quality of the LED screen. Therefore, it is necessary to match at least one luminous intensity of the LED screen with at least one gray scale of the LED screen, and correct the at least one gray scale to a linear state.

A gray scale correction depends on original gray scale luminance data. Currently, gray scale luminance data are collected step by step. In a case of unknown at least one gray level and at least one gray scale characteristic of the LED screen, repeated measurements are required to acquire all gray scale data of the LED screen. In this way, although at least one gray scale luminance displayed by the LED screen is directly measured, due to the large number of gray scales to be measured and a process-speed limit of current acquisition devices, a measurement time of this method is too long, to affect an efficiency of the gray scale correction and user experience. Therefore, there is an urgent need for a method that may implement gray scale measurement rapidly and accurately.

At present, there is no effective solution to the above technical problem that low efficiency of gray scale measurement caused by a requirement that the gray scale measurement is performed step-by-step in the related art.

SUMMARY

Embodiments of the present application provide a method for measurement, a non-transitory storage medium, and a processor.

According to one aspect of an embodiment of the present application, a method for gray scale measurement is provided. The method may include: a first part of gray scale data of an LED screen is collected, when the LED screen is displaying an image; a type of a chip used for driving the LED screen is determined; and a second part of gray scale data of the LED screen is predicted, based on the type of the chip and the first part of gray scale data. The second part of gray scale data of the LED screen is obtained by collecting a small amount of the first part of gray scale data of the LED screen, when the LED screen is displaying an image as measurement data, and predicting based on the periodic change of the gray scale data, so as to improve an efficiency of the gray scale measurement.

Optionally, the step that the second part of gray scale data of the LED screen is predicted, based on the type of the chip and the first part of gray scale data may include: in response to the type of the chip being a first type, a first class of period of the first part of gray scale data is calculated; after the first class of period are acquired and the first part of gray scale data is de-merged, whether the de-merged first part of gray scale data changes periodically is judged, to obtain a judgment result; in response to the judgment result indicating that the de-merged first part of gray scale data changes periodically, the second part of gray scale data of the LED screen is predicted through a first mode based on the de-merged first part of gray scale data; and in response to the judgment result indicating that the de-merged first part of gray scale data does not change periodically, the second part of gray scale data of the LED screen through a second mode is predicted based on the de-merged first part of gray scale data. Therefore, the second part of gray scale data is predicted based on the first part of gray scale data, in the case that the chip being high effective is achieved.

Optionally, the step that the first class of period of the first part of gray scale data is calculated may include: multiple gray scale data of the LED screen is measured step by step, to obtain the first part of gray scale data; a degree of correlation between the multiple gray scale data from the first part of gray scale data at different gray scale intervals is acquired; and the first class of period is determined based on the degree of correlation.

Optionally, difference value between luminance of gray scale data in the same period of the first class of period is no more than a threshold.

Optionally, the step that whether the de-merged first part of gray scale data changes periodically, to obtain the judgment is judged may include: N of the de-merged first part of gray scale data of the LED screen is measured step by step, and whether the N of the de-merged first part of gray scale data changes periodically is detected; in response to the N of the de-merged first part of gray scale data being not changing periodically, gray scale data measured step by step is increased until the de-merged first part of gray scale data changes periodically, and that a second class of period exists is determined; and in response to the number of gray scales measured step by step reaching a preset threshold and no more than three periods existing, that the N of the de-merged first part of gray scale data does not change periodically is determined.

Optionally, luminance of gray scale data in the same period of the second class of period shows an increasing trend.

Optionally, the step that the second part of gray scale data of the LED screen is predicted, based on the type of the chip and the first part of gray scale data may include: in response to the type of the chip of the LED screen being a second type, whether the first part of gray scale data changes periodically is judged, to obtain a judgment result; in response to the judgment result indicating that the first part of gray scale data changes periodically, the second part of gray scale data of the LED screen is predicted based on the first part of gray scale data through a first mode; and in response to the judgment result indicating that the first part of gray scale data does not change periodically, the second part of gray scale data of the LED screen is predicted based on the first part of gray scale data through a second mode. Therefore, the second part of gray scale data is predicted based on the first part of gray scale data, in response to the chip being low effective is achieved.

Optionally, the second part of gray scale data of the LED screen is predicted based on the type of the chip and the first part of gray scale data may include: in response to the type of the chip of the LED screen being a third type, through the following steps to predict the second part of gray scale data of the LED screen based on the first part of gray scale data: step 1, multiple gray scale data of the LED screen is measured step by step until n consecutive gray scale data on a straight line is obtained, and the next gray scale data of the LED screen using a slope of the straight line is predicted, and in response to a predicted value for the next gray scale data being met, a measurement step size for measuring the LED screen step by step is increased, wherein gray scale data not measured in the middle of the LED screen being calculated through a interpolation prediction; and step 2, in response to the predicted value for the next gray scale data being not met, a previous measurement point is returned to, and the step 1 is returned to until all the gray scale data of the LED screen is predicted. Therefore, the second part of gray scale data is predicted based on the first part of gray scale data, in response to the chip neither high effective nor low effective being achieved.

Optionally, the first mode may include a first gray scale data is measured in each period as a reference point, and the rest of gray scale data of the LED screen is predicted according to a periodic rule; a last gray scale data is selected in each period as a test point; in response to a prediction for the test point being correct, the next period is proceeded to; and in response to the prediction for the test point being incorrect, a prediction with a penultimate gray scale data is performed as a test point, until a predicted value matches a measured value.

Optionally, the second mode may include: step 1, multiple gray scale data of the LED screen is measured step by step until n consecutive gray scale data on a straight line is obtained, and the next gray scale data of the LED screen is predicted using a slope of the straight line; and in response to a predicted value for the next gray scale data being met, a measurement step size for measuring the LED screen step by step is increased, wherein gray scale data not measured in the middle of the LED screen being calculated through a interpolation prediction; and step 2, in response to the predicted value for the next gray scale data being not met, a previous measurement point is returned to, and the step 1 is returned to until all the gray scale data of the LED screen is predicted.

According to another aspect of an embodiment of the present application, an apparatus for gray scale measurement is provided. The apparatus may include: a collection component, configured to collect a first part of gray scale data of an LED screen when the LED screen is displaying an image; a type determining component, configured to determine a type of a chip used for driving the LED screen, and a measurement component, configured to predict a second part of gray scale data of the LED screen, based on the type of the chip and the first part of gray scale data. The second part of gray scale data of the LED screen is obtained by collecting a small amount of first part of gray scale data of the LED screen, when the LED screen is displaying an image as measurement data and predicting based on the periodic change of the gray scale data, the efficiency of gray scale measurement is improved.

Optionally, the measurement component may include: a first calculation component, configured to calculate, in response to the type of the chip being a first type, a first class of period of the first part of gray scale data, a judgment component, configured to judge, after the first class of period are acquired and the first part of gray scale data is de-merged, whether the de-merged first part of gray scale data changes periodically, to obtain a judgment result; a first measurement component, configured to predict, in response to the judgment result indicating that the de-merged first part of gray scale data changes periodically, the second part of gray scale data of the LED screen through a first mode based on the de-merged first part of gray scale data, and a second measurement component, configured to predict, in response to the judgment result indicating that the de-merged first part of gray scale data does not change periodically, the second part of gray scale data of the LED screen based on the de-merged first part of gray scale data through a second mode. Therefore, the second part of gray scale data is predicted based on the first part of gray scale data through a second mode, in response to the chip being high effective is achieved.

Optionally, the first calculation component may include: a step-by-step measurement subcomponent, configured to measure multiple gray scale data of the LED screen step by step, to obtain the first part of gray scale data; an acquisition subcomponent, configured to acquire a degree of correlation between the multiple gray scale data from the first part of gray scale data at different gray scale intervals; and a period determining subcomponent, configured to determine the first class of period based on the degree of correlation.

Optionally, the judgment component may include, a detection subcomponent, configured to measure N of the de-merged first part of gray scale data of the LED screen step by step, and detect whether the N of the de-merged first part of gray scale data changes periodically; a first judgment subcomponent, configured to increase, in response to the N of the de-merged first part of gray scale data being not changing periodically, gray scale data measured step by step until the de-merged first part of gray scale data changes periodically, and determine that a second class of period exist; and a second judgment subcomponent, configured to determine, in response to the number of gray scales measured step by step reaching a preset threshold and no more than three periods existing, that the N of the de-merged first part of gray scale data does not change periodically.

Optionally, the measurement component may include, a period judgment component, configured to judge, in response to the type of the chip of the LED screen being a second type, whether the first part of gray scale data changes periodically, to obtain a judgment result; a third measurement component, configured to predict, in response to the judgment result indicating that the first part of gray scale data changes periodically, the second part of gray scale data of the LED screen through a first mode based on the first part of gray scale data; and a fourth measurement component, configured to predict, in response to the judgment result indicating that the first part of gray scale data does not change periodically, the second part of gray scale data of the LED screen based on the first part of gray scale data through a second mode. Therefore, the second part of gray scale data is predicted based on the first part of gray scale data in response to the chip being low effective is achieved.

Optionally, the measurement component may include: in response to the type of the chip of the LED screen being a third type, through the following components to predict the second part of gray scale data of the LED screen is predicted based on the first part of gray scale data a fifth measurement component, configured to perform step 1: multiple gray scale data of the LED screen is measured step by step until n consecutive gray scale data on a straight line is obtained, and the next gray scale data of the LED screen is predicted using a slope of the straight line; and in response to a predicted value for the next gray scale data being met, a measurement step size for measuring the LED screen step by step is increased, wherein gray scale data not measured in the middle of the LED screen being calculated through a interpolation prediction, and a sixth measurement component, configured to perform step 2: in response to the predicted value for the next gray scale data being not met, a previous measurement point is returned to and the fifth measurement component is returned to perform the step 1 until all the gray scale data of the LED screen is predicted. Therefore, the second part of gray scale data is predicted based on the first part of gray scale data in response to the chip being neither high effective nor low effective is achieved.

Optionally, the first mode may include: a first measurement subcomponent, configured to measure a first gray scale data in each period of the LED screen as a reference point, and predict the rest of gray scale data of the LED screen according to a periodic rule, a selection subcomponent, configured to select a last gray scale data in each period as a test point to be predicted; a skip subcomponent, configured to proceed, in response to a prediction for the test point being correct, to the next period; and a second measurement subcomponent, configured to perform, in response to the prediction for the test point being incorrect, a prediction on a penultimate gray scale data as the test point until a predicted value matches a measured value.

Optionally, the second mode may include: a third measurement subcomponent, configured to perform step 1: multiple gray scale data of the LED screen is measured step by step until n consecutive gray scale data on a straight fine is obtained, and the next gray scale data of the LED screen is predicted using a slope of the straight line; and in response to a predicted value for the next gray scale data being met, a measurement step size for measuring the LED screen step by step is increased, wherein gray scale data not measured in the middle of the LED screen being calculated through a interpolation prediction; and a fourth measurement subcomponent, configured to perform step 2: in response to the predicted value for the next gray scale data being not met, a previous measurement point is returned to and the third measurement subcomponent is returned to perform the step 1 until all the gray scale data of the LED screen is predicted.

According to still another aspect of an embodiment of the present application, a non-transitory storage medium is provided, wherein the non-transitory storage medium may include a stored program, and the program, and when the computer program is running, a device where the non-transitory storage medium is located is controlled to perform the above method.

According to still another aspect of an embodiment of the present application, wherein the processor is configured to run a computer program, and the computer performs the above method while running.

BRIEF DESCRIPTION OF THE DRAWINGS

The accompanying drawings are included to provide a further understanding of the present application, and constitute a part of the present application. The illustrative embodiments of the present application and the description thereof are intended to be illustrative of the present application and are not to be construed as unduly limiting for the present application. In the drawings.

DETAILED DESCRIPTION OF THE EMBODIMENTS

In order to enable those skilled in the art to better understand the technical solutions of the present application, the following will clearly and completely describe the technical solutions according to the embodiments of the present application with reference to the accompanying drawings according to the embodiments of the present application. Apparently, the described embodiments are only a part of the embodiments of the present application, rather than all the embodiments. Based on the embodiments of the present application, all other embodiments obtained by those of ordinary skill in the art without any creative work shall fall within a scope of protection of the present application.

It should be noted that the terms "first", "second" and the like in the description, claims and drawings of the present application are used for distinguishing between similar objects and not necessarily for describing a particular sequential or chronological order. It should be understood that the data used in this way may be interchanged under appropriate circumstances, such that the embodiments of the present application described herein may be implemented in sequences other than those illustrated or otherwise described herein. Furthermore, the terms "including" and "having" as well as any variations thereof, are intended to cover a non-exclusive inclusion, for example, processes, methods, systems, products or devices including a series of steps or components are not necessarily limited to those clearly listed steps or components, but may include other steps or components that are not clearly listed or are inherent to these processes, methods, products or devices.

According to an embodiment of the present application, a method embodiment of a method for gray scale measurement is provided. It should be noted that the steps illustrated in the flow diagram of the accompanying drawings may be performed in a computer system such as a set of computer-executable instructions, and that, although a logical sequence is illustrated in the flow diagram, in some instances, the steps shown or described may be performed in an order different from that shown herein.

Figure 1:
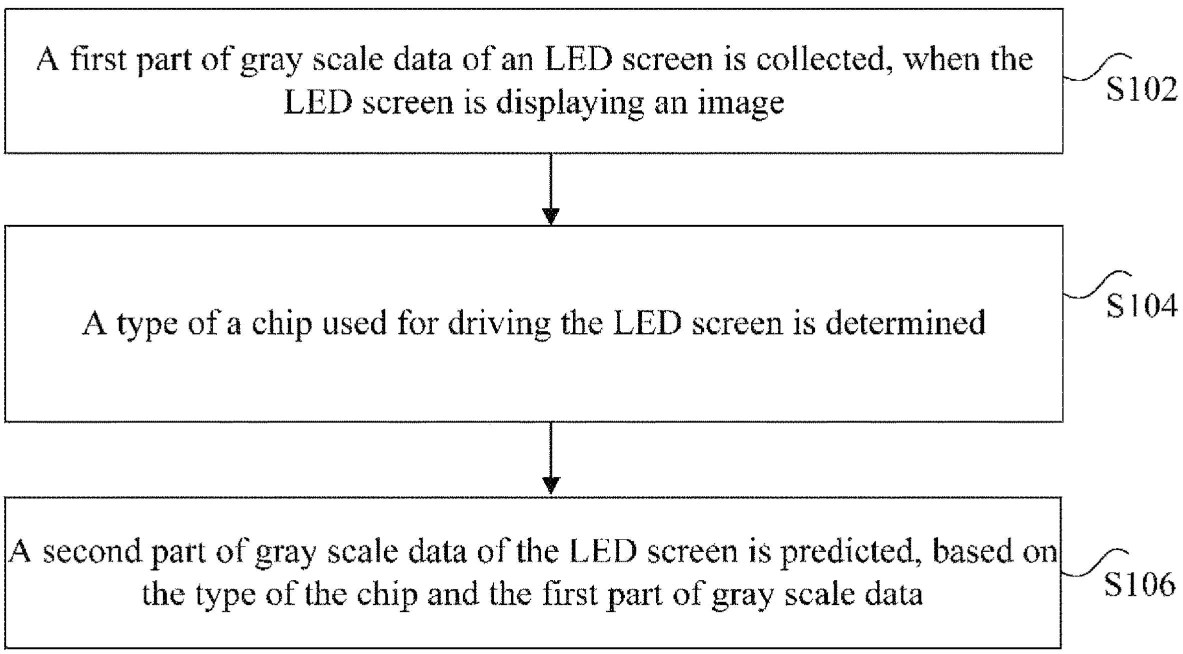
FIG. 1 is a schematic flow diagram of a method for gray scale measurement according to an embodiment of the present application.

FIG. 1 is a schematic flow diagram of a method for gray scale measurement according to an embodiment of the present application. As shown in FIG. 1, the method for gray scale measurement according to an embodiment of the present application may include the following steps:

At step S102, a first part of gray scale data of an LED screen is collected, when the LED screen is displaying an image.

Different from the related art that all gray scale data needs to be measured step by step when the LED screen is displaying an image, which leads to a large computation and low efficiency of gray scale measurement, according to the embodiment of the present application. When the LED screen displays an image, part of measurement data of the LED screen is collected as the first part of gray scale data, and the rest of gray scale data of the LED screen (that is to say, a second part of gray scale data in the embodiment of the present application) is predicted based on periodic changes of the first part of gray scale data. For details, see steps S104 and S106.

At step S104, a type of a chip used for driving the LED screen is determined.

The type of the chip of the LED screen in the embodiment of the present application may include, high effective, low effective, or neither high effective nor low effective.

It should be noted that if the chip in the embodiment of the present application is high effective, the chip is recorded as a first type of chip (that is to say, the type of the chip of the LED screen in the embodiment of the present application is the first type); if the chip is low effective, the chip is recorded as a second type of chip (that is to say, the type of the chip of the LED screen in the embodiment of the present application is the second type); and if the chip is neither high effective nor low effective, the chip is recorded as a third type of chip (that is to say, the type of the chip of the LED screen in the embodiment of the present application is the third type).

At step S106: a second part of gray scale data of the LED screen is predicted, based on the type of the chip and the first part of gray scale data.

Based on the type of the chip of the LED screen determined in the step S104, the second part of gray scale data of the LED screen is predicted based on the chip of each type and the first part of gray scale data.

In summary, the method for gray scale measurement in the embodiment of the present application may include the following three implementation methods:

Method 1 for the case that the type of the chip of the LED screen is the first type.

Optionally, the step S106 that the second part of gray scale data of the LED screen is predicted based on the type of the chip and the first part of gray scale data may include: in response to the type of the chip of the LED screen being the first type, a first class of period of the first part of gray scale data is calculated, after the first class of period are acquired and the first part of gray scale data is de-merged, whether the de-merged first part of gray scale data changes periodically is judged, to obtain a judgment result; in response to the judgment result indicating that the de-merged first part of gray scale data changes periodically, the second part of gray scale data of the LED screen is predicted based on the de-merged first part of gray scale data through a first mode; and in response to the judgment result indicating that the de-merged first part of gray scale data does not change periodically, the second part of gray scale data of the LED screen is predicted based on the de-merged first part of gray scale data through a second mode. Therefore, the second part of gray scale data is predicted based on the first part of gray scale data, in response to the chip being high effective is achieved.

Optionally, in the method for gray scale measurement in the embodiment of the present application, CA410 may be selected as a measurement device, and a level of the chip of the LED screen to be measured is determined before the first class of period T1 of the gray scale data are calculated. In the embodiment of the present application, the level of the chip of the LED screen to be measured may include: high effective, low effective or the like (neither high effective nor low effective).

Figure 2:
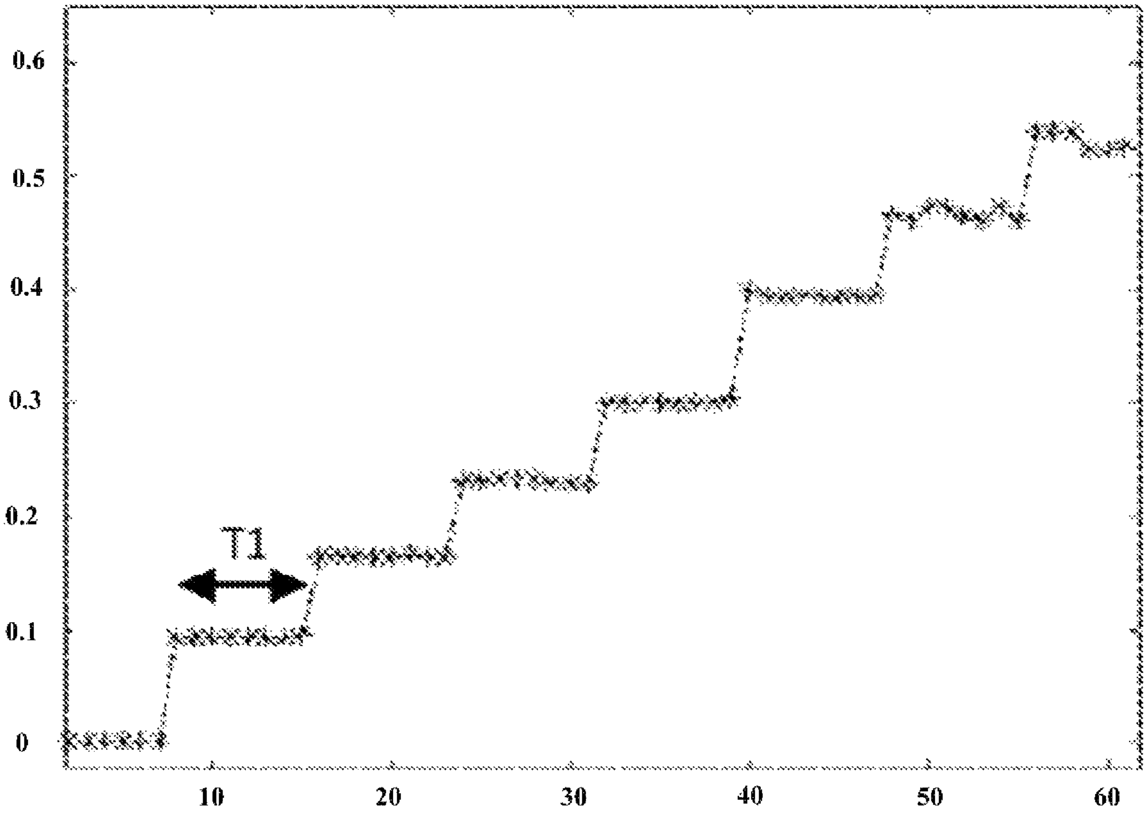
FIG. 2 is a schematic diagram of a first class of period in a method for gray scale measurement according to an embodiment of the present application.

A gray level of the chip of the LED screen generally does not exceed 16 bits. Gray scales of a chip which is less than 16 bits and high effective show merged gray scales, as shown in FIG. 2. FIG. 2 is a schematic diagram of the first class of period in the method for gray scale measurement in the embodiment of the present application. Periods which cause gray scale merging due to insufficient gray levels are determined as the first class of period T1. It should be noted that the measurement efficiency by combining with the CA410 rapid measurement device may be further improved in the embodiment of the present application. The method for gray scale measurement in the embodiment of the present application is illustrated only by using the CA410 rapid measurement device as a preferred example, to realize the method for gray scale measurement in the embodiment of the present application, without any limitation.

Optionally, the step that the first class of period of the first part of gray scale data is calculated may include: multiple gray scale data of the LED screen is measured step by step, to obtain the first part of gray scale data; acquire a degree of correlation between the multiple gray scale data from the first part of gray scale data at different gray scale intervals is acquired; and the first class of period is determined based on the degree of correlation.

Optionally, difference value between luminance of gray scale data in the same period of the first class of period is no more than a threshold. That is to say, luminance of gray scale data in the same period of the first class of period is approximate or equal.

Optionally, the step that the first class of period of the first part of gray scale data is calculated specifically may include the following steps:

N1 gray scale data is measured step by step to explore and calculate the first class of period T1.

The first class of period are calculated by adopting an autocorrelation analysis method, and the degree of correlation between gray scale data at different gray scale intervals is measured through an autocorrelation function, which may be expressed as a function of a gray scale interval τ:

$$R(\tau) = \frac{E[(X_0 - \mu)(X_\tau - \mu)]}{\sigma^2};$$

Wherein $$X_0=\{d\mathrm{Lum}_1, d\mathrm{Lum}_2, \ldots d\mathrm{Lum}_{n\tau}\}, X_0=\{d\mathrm{Lum}_1, d\mathrm{Lum}_2, \ldots, d\mathrm{Lum}_{n\tau}\},$$

$$X_\tau=\{d\mathrm{Lum}_{1+\tau}, d\mathrm{Lum}_{2+\tau}, \ldots d\mathrm{Lum}_{n+\tau}+, d\mathrm{Lum}_1, d\mathrm{Lum}_2, \ldots, d\mathrm{Lum}_{n\tau}\},$$

$$d\mathrm{Lum}_i=\mathrm{Lum}_{i+1}-\mathrm{Lum}_i.$$

$\mathrm{Lum}_i$ is used for presenting the luminance of an ith gray scale, μ and $\sigma^2$ is used for presenting a mathematical expectation and variance respectively, and $X_0$ and $X_\tau$ have the same mathematical expectation and variance. If the gray scale has a period T, an autocorrelation function thereof is also a periodic function of the period T, and a maximum value is acquired when τ=T. The period T may be determined based on a spacing of peaks of an autocorrelogram.

In addition, a step that the first class of period of the gray scale data is calculated may be omitted for that a gray level may be accurately predicted.

Optionally, whether the de-merged first part of gray scale data changes periodically is judged, to obtain the judgment may include. N of the de-merged first part of gray scale data of the LED screen is measured step by step, and whether the N of the de-merged first part of gray scale data changes periodically is detected; in response to the N of the de-merged first part of gray scale data being not changing periodically, gray scale data measured step by step is increased until the de-merged first part of gray scale data changes periodically, and that a second class of period exists is determined; and in response to the number of gray scales measured step by step reaching a preset threshold and no more than three periods existing, that the N of the de-merged first part of gray scale data does not change periodically is determined.

Optionally, luminance of gray scale data in the same period of the second class of period shows an increasing trend.

Figure 3:
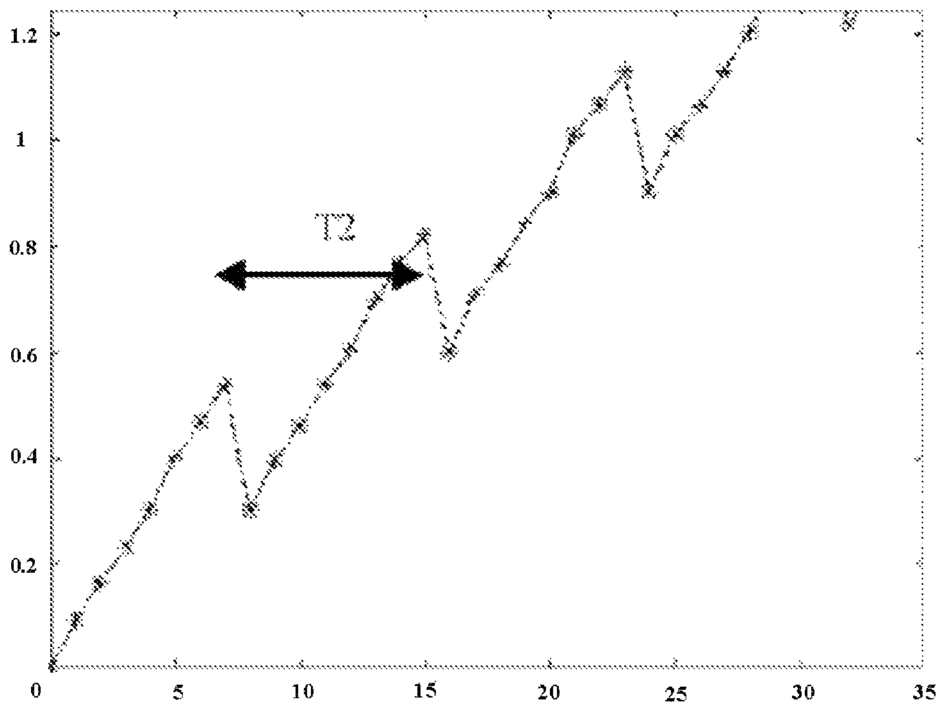
FIG. 3 is a schematic diagram of a second class of period in a method for gray scale measurement according to an embodiment of the present application.

Optionally, after de-merging of the first part of gray scale data, some of gray scale data of the screen still shows a distinct periodic rule, as shown in FIG. 3, which is a schematic diagram of the second class of period in the method for gray scale measurement in the embodiment of the present application. The periods are referred to as the second class of period T2.

It should be noted that in the embodiment of the present application, the second class of period T2 and the first class of period T1 are calculated in the same method, and both using autocorrelation analysis. In this case, it should be noted that if the periods of an LED screen of 16 bits are directly calculated through the autocorrelation analysis, it is likely that the second class of period T2 may be mistakenly counted as the first class of period T1. Therefore, it should be distinguished that the luminance of each gray scale in the first class of period is almost equal, while the luminance of the second class of period is almost incremental (taking into account at least one measurement error and a rebound phenomenon).

In order to ensure an accuracy of the calculation, in the embodiment of the present application, at least three periods of gray scale data are measured step by step (seven or more equally spaced peaks appear in the autocorrelogram). Since an approximate value of the second class of period T2 may not be predicted, N2 gray scale data is first measured step by step, and if it is not detected that more than three periods, the gray scale data measured step by step is increased until three or more periods appear. For the case that there is no period or gray scale data is very linear, no matter how many gray scales are measured step by step, three or more periods may not appear. If there are no three periods existing when a step-by-step measured value reaches a certain upper limit (N2_Max), T2=1. In addition, the second class of period is generally $2^n$. If not, T2=1.

Method 2: for the case that the type of the chip of the LED screen is the second type.

Optionally, the step that the second part of gray scale data of the LED screen is predicted, based on the type of the chip and the first part of gray scale data may include, in response to the type of the chip of the LED screen being the second type, whether the first part of gray scale data changes periodically is judged; in response to a judgment result indicating that the first part of gray scale data changes periodically, the second part of gray scale data of the LED screen is predicted based on the first part of gray scale data through a first mode; and in response to the judgment result indicating that the first part of gray scale data does not change periodically, the second part of gray scale data of the LED screen is predicted based on the first part of gray scale data through a second mode. Therefore, the second part of gray scale data is predicted based on the first part of gray scale data, in response to the chip being low effective is achieved.

In response to the type of the chip of the LED screen is the second type, the first class of period of the gray scale data are determined as T1=1. That is to say, the gray scale data changes periodically.

In the embodiment of the present application, a process of calculating the second class of period is the same for both method 1 and the method 2, a difference being that in method 2, merged gray scale data is not required.

With the method 1 and the method 2, the second part of gray scale data of the LED screen is predicted based on the first part of gray scale data through the first mode may include: a first gray scale data in each period of the LED screen is measured as a reference point, and the rest of gray scale data of the LED screen is predicted according to a periodic rule; a last gray scale data in each period is selected as a test point to be predicted; in response to a prediction for the test point being correct, the next period is proceeded to; and in response to the prediction for the test point being incorrect, a prediction is performed on a penultimate gray scale data as the test point until a predicted value matches a measured value.

Optionally, for the case that gray scale data after de-merging still has a distinct periodic rule, that is to say, when T2 is not equal to 1, the first method is used for measurement and prediction.

The first gray scale data in each period is measured as a reference point, and the rest of gray scale data of the LED screen is predicted according to the periodic rule. The last gray scale data in each period is selected as the test point to be predicted. If the prediction for the test point is correct, the next period is proceeded. If the prediction for the test point is incorrect, the penultimate gray scale data is tested. The operations are repeated until the predicted value matches the measured value.

In this way, the method for gray scale measurement in the embodiment of the present application may estimate a reduced space of gray scale measurement in different cases. In the case of the first method used for measurement and prediction, the reduced space of gray scale measurement may be about 1−(1/T1)*(2/T2). In the case of the first method used for measurement and prediction, 1−(1/T1)*P, wherein P depends on whether gray scales are linear, and fully linear<piecewise linear<not linear.

With the method 1 and the method 2, the step that the second part of gray scale data of the LED screen is predicted based on the first part of gray scale data through the second mode may include: Step 1: multiple scale data of the LED screen is measured step by step until n consecutive gray scale data on a straight line is obtained, and the next gray scale data of the LED screen using a slope of the straight line is predicted; and in response to a predicted value for the next gray scale data being met, a measurement step size for measuring the LED screen step by step is increased, wherein gray scale data not measured in the middle of the LED screen being calculated through a interpolation prediction. Step 2: In response to the predicted value for the next gray scale data being not met, a previous measurement point is returned to and the step 1 is returned to until all the gray scale data of the LED screen is predicted.

Optionally, the second mode is used for measurement and prediction for the case that there is no distinct periodic rule, linearity, or piecewise linearity after removal of gray scale merging caused by insufficient gray levels, that is to say, when T2=1.

Step 1: multiple gray scale data is measured step by step until n consecutive gray scale data is on a straight line, and the next point is predicted using the slope of the straight line. If the predicted value is met, the measurement step size for measuring the LED screen step by step is increased (when the step size exceeds a certain threshold, decrease the step size appropriately), and repeat the operations. Gray scale data not measured in the middle of the LED screen is calculated through a interpolation prediction.

Step 2: In response to the predicted value for the next gray scale data being not met, a previous measurement point is returned to and the Step 1 is returned to until all the gray scale data of the LED screen is predicted.

Method 3: for the case that the type of the chip of the LED screen is the third type.

Optionally, the step that the second part of gray scale data of the LED screen is predicted based on the type of the chip and the first part of gray scale data may include: in response to the type of the chip of the LED screen is the third type, the second part of gray scale data of the LED screen is predicted based on the first part of gray scale data may include: Step 1: multiple gray scale data of the LED screen is measured step by step until n consecutive gray scale data on a straight line is obtained, and the next gray scale data of the LED screen is predicted using a slope of the straight line, and in response to a predicted value for the next gray scale data being met, a measurement step size for measuring the LED screen step by step is increased, wherein gray scale data not measured in the middle of the LED screen being calculated through a interpolation prediction. Step 2 In response to the predicted value for the next gray scale data being not met, a previous measurement point is returned to and the Step 1 is returned to until all the gray scale data of the LED screen is predicted. Therefore, the second part of gray scale data is predicted based on the first part of gray scale data in response to the chip being neither high effective nor low effective is achieved.

Optionally, for the case that there is no distinct periodic rule, linearity, or piecewise linearity after removal of gray scale merging caused by insufficient gray levels, that is to say, when T2=1, the step that the collected gray scale data is predicted specifically may include the following steps:

Step 1: multiple gray scale data is measured step by step until n consecutive gray scale data is on a straight line. The next point is predicted using the slope of the straight fine. If the predicted value is met, the measurement step size for measuring the LED screen step by step is increased (when the step size exceeds a certain threshold, the step size is decreased appropriately), and repeat the operations. Gray scale data not measured in the middle of the LED screen is calculated through a interpolation prediction.

Step 2: In response to the predicted value for the next gray scale data being not met, a previous measurement point is returned to and the Step 1 is returned to until all the grayscale data of the LED screen is predicted.

Based on the rule and characteristic of gray scales and by combination with the CA410 rapid measurement device, the problem of low efficiency of gray scale measurement is solved, to ensure the accuracy of data and greatly improve an user experience in the method for gray scale measurement in the embodiment of the present application Various rules and characteristics of gray scale data based on a small amount of measurement data may be explored in the method for gray scale measurement in the embodiment of the present application, and different measurements, prediction and test strategies are selected on the basis of the rules in order to obtain more gray scale data with a small number of measurement-times, thus the accuracy of data is ensured while the efficiency is improved.

The first part of gray scale data of the LED screen is collected when the LED screen is displaying an image; a type of a chip used for driving the LED screen is determined; and the second part of gray scale data of the LED screen is predicted based on the type of the chip and the first part of gray scale data. Technical effects of exploring the various laws and characteristics of gray scale data are achieved based on a small amount of measurement data in the embodiment of the present application, and different measurement, prediction and test strategies are selected on the basis of rules in order to obtain more gray scale data with a small number of measurement-times, thus the accuracy of data is ensured while the efficiency is improved. Therefore, the technical problem of low efficiency of gray scale measurement caused by the need of step-by-step gray scale measurement in the related art is solved.

Figure 4:
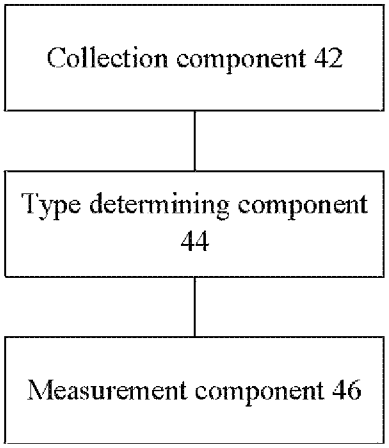
FIG. 4 is a schematic diagram of an apparatus for gray scale measurement according to an embodiment of the present application.

According to another aspect of an embodiment of the present application, an apparatus for gray scale measurement is further provided. FIG. 4 is a schematic diagram of the apparatus for gray scale measurement according to an embodiment of the present application. As shown in FIG. 4, the apparatus for gray scale measurement in the embodiment of the present application may include:

a collection component 42, configured to collect a first part of gray scale data of an LED screen when the LED screen is displaying an image:

a type determining component 44, configured to determine a type of a chip used for driving the LED screen; and a measurement component 46, configured to predict a second part of gray scale data of the LED screen, based on the type of the chip and the first part of gray scale data.

The second part of gray scale data of the LED screen is acquired by collecting a small amount of the first part of gray scale data of the LED screen when the LED screen is displaying an image as measurement data, and predicting based on the periodic change of the gray scale data, to improve the efficiency of gray scale measurement.

Optionally, the measurement component 46 may include, a first calculation component, configured to calculate, in response to the type of the chip being a first type, a first class of period of the first part of gray scale data; a judgment component, configured to judge, after the first class of period are acquired and the first part of gray scale data is de-merged, whether the de-merged first part of gray scale data changes periodically, to obtain a judgment result, a first measurement component, configured to predict, in response to the judgment result, indicating that the de-merged first part of gray scale data changes periodically, the second part of gray scale data of the LED screen through a first mode based on the de-merged first part of gray scale data; and a second measurement component, configured to predict, in response to the judgment result indicating that the de-merged first part of gray scale data does not change periodically, the second part of gray scale data of the LED screen based on the de-merged first part of gray scale data a through a second mode. Therefore, the second part of gray scale data is predicted based on the first part of gray scale data in response to the chip being high effective is achieved.

Optionally, the first calculation component may include: a step-by-step measurement subcomponent, configured to measure multiple gray scale data of the LED screen step by step, to obtain the first part of gray scale data; an acquisition subcomponent, configured to acquire a degree of correlation between the multiple gray scale data from the first part of gray scale data at different gray scale intervals; and a period determining subcomponent, configured to determine the first class of period based on the degree of correlation.

Optionally, the judgment component may include: a detection subcomponent, configured to measure N of the de-merged first part of gray scale data of the LED screen step by step, and detect whether the N of the de-merged first part of gray scale data changes periodically; a first judgment subcomponent, configured to increase, in response to the N of the de-merged first part of gray scale data being not changing periodically, gray scale data measured step by step until the de-merged first part of gray scale data changes periodically, and determine that a second class of period exists; and a second judgment subcomponent, configured to determine, in response to the number of gray scales measured step by step reaching a preset threshold and no more than three periods existing, that the N of the de-merged first part of gray scale data does not change periodically.

Optionally, the measurement component 46 may include: a period judgment component, configured to judge, in response to the type of the chip of the LED screen being a second type, whether the first part of gray scale data changes periodically to obtain a judgment result; a third measurement component, configured to predict, in response to the judgment result indicating that the first part of gray scale data changes periodically, the second part of gray scale data of the LED screen based on the first part of gray scale data through a first mode; and a fourth measurement component, configured to predict, in response to the judgment result indicating that the first part of gray scale data does not change periodically, the second part of gray scale data of the LED screen based on the first part of gray scale data through a second mode. Therefore, the second part of gray scale data is predicted based on the first part of gray scale data, in response to the chip being low effective is achieved.

Optionally, the measurement component 46 may include: in response to the type of the chip of the LED screen being a third type, through the following components to predict the second part of gray scale data of the LED screen based on the first part of gray scale data: a fifth measurement component, configured to perform step 1: multiple gray scale data of the LED screen is measured step by step until n consecutive gray scale data on a straight line is obtained, and the next gray scale data of the LED screen is predicted using a slope of the straight line; and in response to a predicted value for the next gray scale data being met, a measurement step size for measuring the LED screen step by step is increased, wherein gray scale data not measured in the middle of the LED screen being calculated through a interpolation prediction, and a sixth measurement component, configured to perform step 2: in response to the predicted value for the next gray scale data being not met, a previous measurement point is returned to and the fifth measurement component is returned to perform the step 1 until all the gray scale data of the LED screen is predicted. Therefore, the second part of gray scale data is predicted based on the first part of gray scale data, in response to the chip being neither high effective nor low effective is achieved.

Optionally, the first mode may include, a first measurement subcomponent, configured to measure a first gray scale data in each period of the LED screen as a reference point, and predict the rest of gray scale data of the LED screen according to a periodic rule; a selection subcomponent, configured to select a last gray scale data in each period as a test point to be predicted, a skip subcomponent, configured to proceed, in response to a prediction for the test point being correct, to the next period; and a second measurement subcomponent, configured to perform, in response to the prediction for the test point being incorrect, a prediction on a penultimate gray scale data as the test point until a predicted value matches a measured value.

Optionally, the second mode may include: a third measurement subcomponent, configured to perform step 1: multiple gray scale data of the LED screen is measured step by step until n consecutive gray scale data on a straight line is obtained, and the next gray scale data of the LED screen is predicted using a slope of the straight line; and in response to a predicted value for the next gray scale data being met, a measurement step size for measuring the LED screen step by step is increased, wherein gray scale data not measured in the middle of the LED screen being calculated through a interpolation prediction, and a fourth measurement subcomponent, configured to perform step 2, in response to the predicted value for the next gray scale data being not met, a previous measurement point is returned to and the third measurement subcomponent is returned to perform the step 1 until all the gray scale data of the LED screen is predicted.

According to still another aspect of an embodiment of the present application, a non-transitory storage medium is further provided. The non-transitory storage medium may include a stored computer program, when the computer program is running, a device where the non-transitory storage medium is located is controlled to perform the above method in above embodiment.

According to still another aspect of an embodiment of the present application, a processor is further provided. The processor is configured to run a computer program, and the computer program, performs the above method in above embodiment.

The above serial numbers of the embodiments of the present application are merely for the purpose of description and do not indicate the superiority or inferiority of the embodiments.

In the above embodiments of the present application, the description of each embodiment has its own emphasis, and reference may be made to the relevant description of other embodiments for the parts of one embodiment not described in detail.

According to the embodiments provided herein, it should be understood that the disclosed technology may be implemented in other ways. The apparatus embodiment described above is merely illustrative. For example, the components may be divided based on logical functions, and may be divided in other ways during practical implementations. For example, multiple components or components may be combined or integrated into another system. Alternatively, some features may be omitted, or not performed. Alternatively, couplings or direct couplings or communication connections shown or discussed with respect to each other may be indirect couplings or communication connections through some interfaces, components, or components, and may be electrical or otherwise.

The components described as separate components may or may not be physically separated, the components shown as components may or may not be physical components, i.e. may be located in one place, or may be distributed over multiple components. Some or all of the components may be selected to achieve the objectives of the embodiments according to actual needs.

In addition, various functional components in various embodiments of the present application may be integrated in one processing component, the components may be physically separate, or two or more components may be integrated in a component. The above-mentioned integrated components may be implemented in a form of hardware or in a form of software functional components.

The integrated component, if implemented in the form of a software functional component and sold or used as a stand-alone product, may be stored in a computer-readable storage medium. In this way, the technical solutions of the present application, either in essence or in part contributing to the related art, or all or part of the technical solutions, may be embodied in the form of a software product stored in a storage medium, including multiple instructions to cause a computer device, which may be a personal computer, a server or a network device, etc. to perform all or part of the steps of the apparatus, according to various embodiments of the present application. The above storage medium may include a USB flash disk, a read-only memory (ROM), a random access memory (RAM), a mobile hard disk drive, a diskette or a compact disc or other media capable of storing program codes.

While the foregoing is directed to the preferred embodiments of the present application. It should be noted that several improvements and modifications can be made by persons of ordinary skill in the art without departing from the principle of the present application, and such improvements and modifications shall also fall within the scope of protection of the present application

What is claimed is:

1. A method for gray scale measurement, comprising:

collecting a first part of gray scale data of an LED screen, when the LED screen is displaying an image;

determining a type of a chip used for driving the LED screen; and predicting a second part of gray scale data of the LED screen, based on the type of the chip and the first part of gray scale data;

wherein predicting the second part of gray scale data of the LED screen, based on the type of the chip and the first part of gray scale data comprises:

in response to the type of the chip being a first type, calculating a first class of period of the first part of gray scale data;

after acquiring the first class of period and de-merging the first part of gray scale data, judging whether the de-merged first part of gray scale data changes periodically, to obtain a judgment result;

in response to the judgment result indicating that the de-merged first part of gray scale data changes periodically, predicting the second part of gray scale data of the LED screen based on the de-merged first part of gray scale data through a first mode; and in response to the judgment result indicating that the de-merged first part of gray scale data does not change periodically, predicting the second part of gray scale data of the LED screen based on the de-merged first part of gray scale data through a second mode.

2. The method as claimed in claim 1, wherein the calculating a first class of period of the first part of gray scale data comprises:

measuring a plurality of gray scale data of the LED screen step by step, to obtain the first part of gray scale data;

acquiring a degree of correlation between the plurality of gray scale data from the first part of gray scale data at different gray scale intervals; and determining the first class of period based on the degree of correlation.

3. The method as claimed in claim 1, wherein difference value between luminance of gray scale data in the same period of the first class of period is no more than a threshold.

4. The method as claimed in claim 1, wherein judging whether the de-merged first part of gray scale data changes periodically, to obtain the judgment result comprises:

measuring N of the de-merged first part of gray scale data of the LED screen step by step, and detecting whether the N of the de-merged first part of gray scale data changes periodically;

in response to the N of the de-merged first part of gray scale data being not changing periodically, increasing gray scale data measured step by step until the de-merged first part of gray scale data changes periodically, and determining that a second class of period exists; and in response to the number of gray scales measured step by step reaching a preset threshold, and no more than three periods existing, determining that the N of the de-merged first part of gray scale data does not change periodically.

5. The method as claimed in claim 4, wherein luminance of gray scale data in the same period of the second class of period shows an increasing trend.

6. The method as claimed in claim 1, wherein predicting the second part of gray scale data of the LED screen, based on the type of the chip and the first part of gray scale data comprises:

in response to the type of the chip of the LED screen being a second type, judging whether the first part of gray scale data changes periodically to obtain a judgment result;

in response to the judgment result indicating that the first part of gray scale data changes periodically, predicting the second part of gray scale data of the LED screen based on the first part of gray scale data through a first mode; and in response to the judgment result indicating that the first part of gray scale data does not change periodically, predicting the second part of gray scale data of the LED screen based on the first part of gray scale data through a second mode.

7. The method as claimed in claim 6, wherein the first mode comprises:

measuring a first gray scale data in each period of the LED screen as a reference point, and predicting the rest of gray scale data of the LED screen according to a periodic rule;

selecting a last gray scale data in each period as a test point to be predicted;

in response to a prediction for the test point being correct, proceeding to the next period; and in response to the prediction for the test point being incorrect, performing a prediction on a penultimate gray scale data as the test point, until a predicted value matches a measured value.

8. The method as claimed in claim 6, wherein the second mode comprises:

step 1, measuring a plurality of gray scale data of the LED screen step by step until n consecutive gray scale data on a straight line is obtained, and predicting the next gray scale data of the LED screen using a slope of the straight line; and in response to a predicted value for the next gray scale data being met, increasing a measurement step size for measuring the LED screen step by step, wherein gray scale data not measured in the middle of the LED screen being calculated through a interpolation prediction; and step 2, in response to the predicted value for the next gray scale data being not met, returning to a previous measurement point and returning to the step 1 until all the gray scale data of the LED screen is predicted.

9. The method as claimed in claim 1, wherein predicting the second part of gray scale data of the LED screen, based on the type of the chip and the first part of gray scale data comprises:

in response to the type of the chip of the LED screen being a third type, through the following steps to predict the second part of gray scale data of the LED screen based on the first part of gray scale data:

step 1, measuring a plurality of gray scale data of the LED screen step by step until n consecutive gray scale data on a straight line is obtained, and predicting the next gray scale data of the LED screen using a slope of the straight line; and in response to a predicted value for the next gray scale data being met, increasing a measurement step size for measuring the LED screen step by step, wherein gray scale data not measured in the middle of the LED screen being calculated through a interpolation prediction; and step 2, in response to the predicted value for the next gray scale data being not met, returning to a previous measurement point and returning to the step 1 until all the gray scale data of the LED screen is predicted.

10. The method as claimed in claim 7, wherein the first mode comprises:

measuring a first gray scale data in each period of the LED screen as a reference point, and predicting the rest of gray scale data of the LED screen according to a periodic rule;

selecting a last gray scale data in each period as a test point to be predicted;

in response to a prediction for the test point being correct, proceeding to the next period; and in response to the prediction for the test point being incorrect, performing a prediction on a penultimate gray scale data as the test point, until a predicted value matches a measured value.

11. The method as claimed in claim 1, wherein the second mode comprises:

step 1, measuring a plurality of gray scale data of the LED screen step by step until n consecutive gray scale data on a straight line is obtained, and predicting the next gray scale data of the LED screen using a slope of the straight line; and in response to a predicted value for the next gray scale data being met, increasing a measurement step size for measuring the LED screen step by step, wherein gray scale data not measured in the middle of the LED screen being calculated through a interpolation prediction; and step 2, in response to the predicted value for the next gray scale data being not met, returning to a previous measurement point and returning to the step 1 until all the gray scale data of the LED screen is predicted.

12. A non-transitory storage medium, wherein the non-transitory storage medium comprises a stored computer program, and when the computer program is running, a device where the non-transitory storage medium is located is controlled to perform the following steps:

collecting a first part of gray scale data of an LED screen, when the LED screen is displaying an image;

determining a type of a chip used for driving the LED screen; and predicting a second part of gray scale data of the LED screen, based on the type of the chip and the first part of gray scale data;

wherein predicting the second part of gray scale data of the LED screen, based on the type of the chip and the first part of gray scale data comprises:

in response to the type of the chip being a first type, calculating a first class of period of the first part of gray scale data;

after acquiring the first class of period and de-merging the first part of gray scale data, judging whether the de-merged first part of gray scale data changes periodically, to obtain a judgment result;

in response to the judgment result indicating that the de-merged first part of gray scale data changes periodically, predicting the second part of gray scale data of the LED screen based on the de-merged first part of gray scale data through a first mode; and in response to the judgment result indicating that the de-merged first part of gray scale data does not change periodically, predicting the second part of gray scale data of the LED screen based on the de-merged first part of gray scale data through a second mode.

13. The non-transitory storage medium as claimed in claim 12, wherein predicting the second part of gray scale data of the LED screen, based on the type of the chip and the first part of gray scale data comprises:

in response to the type of the chip being a first type, calculating a first class of period of the first part of gray scale data;

after acquiring the first class of period and de-merging the first part of gray scale data, judging whether the de-merged first part of gray scale data changes periodically, to obtain a judgment;

in response to the judgment result indicating that the de-merged first part of gray scale data changes periodically, predicting the second part of gray scale data of the LED screen based on the de-merged first part of gray scale data through a first mode; and in response to the judgment result indicating that the de-merged first part of gray scale data does not change periodically, predicting the second part of gray scale data of the LED screen based on the de-merged first part of gray scale data through a second mode.

14. The non-transitory storage medium as claimed in claim 13, wherein the calculating a first class of period of the first part of gray scale data comprises:

measuring a plurality of gray scale data of the LED screen step by step, to obtain the first part of gray scale data;

acquiring a degree of correlation between the plurality of gray scale data from the first part of gray scale data at different gray scale intervals; and determining the first class of period based on the degree of correlation.

15. The non-transitory storage medium as claimed in claim 13, wherein judging whether the de-merged first part of gray scale data changes periodically, to obtain the judgment comprises:

measuring N of the de-merged first part of gray scale data of the LED screen step by step, and detecting whether the N of the de-merged first part of gray scale data changes periodically;

in response to the N of the de-merged first part of gray scale data being not changing periodically, increasing gray scale data measured step by step until the de-merged first part of gray scale data changes periodically, and determining that a second class of period exists; and in response to the number of gray scales measured step by step reaching a preset threshold, and no more than three periods existing, determining that the N of the de-merged first part of gray scale data does not change periodically.

16. A processor, wherein the processor is configured to run a computer program, and the computer program performs the following steps while running:

collecting a first part of gray scale data of an LED screen, when the LED screen is displaying an image;

determining a type of a chip used for driving the LED screen; and predicting a second part of gray scale data of the LED screen, based on the type of the chip and the first part of gray scale data;

wherein predicting the second part of gray scale data of the LED screen, based on the type of the chip and the first part of gray scale data comprises;

in response to the type of the chip being a first type, calculating a first class of period of the first part of gray scale data;

after acquiring the first class of period and de-merging the first part of gray scale data, judging whether the de-merged first part of gray scale data changes periodically, to obtain a judgment result;

in response to the judgment result indicating that the de-merged first part of gray scale data changes periodically, predicting the second part of gray scale data of the LED screen based on the de-merged first part of gray scale data through a first mode; and in response to the judgment result indicating that the de-merged first part of gray scale data does not change periodically, predicting the second part of gray scale data of the LED screen based on the de-merged first part of gray scale data through a second mode.

17. The processor as claimed in claim 16, wherein predicting the second part of gray scale data of the LED screen, based on the type of the chip and the first part of gray scale data comprises:

in response to the type of the chip being a first type, calculating a first class of period of the first part of gray scale data;

after acquiring the first class of period and de-merging the first part of gray scale data, judging whether the de-merged first part of gray scale data changes periodically, to obtain a judgment;

in response to the judgment indicating that the de-merged first part of gray scale data changes periodically, predicting the second part of gray scale data of the LED screen based on the de-merged first part of gray scale data through a first mode; and in response to the judgment result indicating that the de-merged first part of gray scale data does not change periodically, predicting the second part of gray scale data of the LED screen based on the de-merged first part of gray scale data through a second mode.

18. The processor as claimed in claim 17, wherein the calculating a first class of period of the first part of gray scale data comprises:

measuring a plurality of gray scale data of the LED screen step by step, to obtain the first part of gray scale data;

acquiring a degree of correlation between the plurality of gray scale data from the first part of gray scale data at different gray scale intervals; and determining the first class of period based on the degree of correlation.

19. The processor as claimed in claim 17, wherein judging whether the de-merged first part of gray scale data changes periodically, to obtain the judgment comprises:

measuring N of the de-merged first part of gray scale data of the LED screen step by step, and detecting whether the N of the de-merged first part of gray scale data changes periodically;

in response to the N of the de-merged first part of gray scale data being not changing periodically, increasing gray scale data measured step by step until the de-merged first part of gray scale data changes periodically, and determining that a second class of period exists; and in response to the number of gray scales measured step by step reaching a preset threshold, and no more than three periods existing, determining that the N of the de-merged first part of gray scale data does not change periodically.

* * * * *